(12) United States Patent
Goyal et al.

(10) Patent No.: US 9,104,666 B2
(45) Date of Patent: Aug. 11, 2015

(54) CONTROLLING ACCESS TO A LARGE NUMBER OF ELECTRONIC RESOURCES

(75) Inventors: Sanyam Goyal, Banagalore (IN); Vikas Pooven Chathoth, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 118 days.

(21) Appl. No.: 13/602,340

(22) Filed: Sep. 4, 2012

(65) Prior Publication Data

US 2014/0068074 A1    Mar. 6, 2014

(51) Int. Cl.
*G06F 17/30* (2006.01)
*G06F 21/60* (2013.01)
*H04L 29/08* (2006.01)

(52) U.S. Cl.
CPC .............. *G06F 17/30* (2013.01); *G06F 21/60* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 6,931,530 B2* | 8/2005 | Pham et al. | 713/165 |
| 7,075,550 B2* | 7/2006 | Bonadio | 345/589 |
| 7,266,605 B2 | 9/2007 | Vasandani et al. | |
| 7,730,410 B2 | 6/2010 | Goering | |
| 8,112,703 B2 | 2/2012 | Kumar et al. | |
| 2006/0294578 A1* | 12/2006 | Burke et al. | 726/2 |
| 2009/0049179 A1 | 2/2009 | Ehms et al. | |
| 2009/0119298 A1* | 5/2009 | Faitelson et al. | 707/9 |
| 2010/0094883 A1 | 4/2010 | Lau et al. | |
| 2011/0061093 A1* | 3/2011 | Korkus et al. | 726/4 |
| 2012/0304247 A1* | 11/2012 | Badger et al. | 726/1 |

OTHER PUBLICATIONS

"Lei Zhang", "Xian Wu", "Yong Yu", Emergent Semantics From Folksonomies , Journal on Data Semantics VI, LNCS 4090, pp. 168-186,Dated 2006.

"Paul Ashley", "Sridhar Muppidi", How Tivoli Access Manager Secures Your Web Portals, http://www.devx.com/ibm/Article/16034, Downloaded circa Feb. 16, 2012, pp. 1-3, IBM.

Novell access manager, Novell Access Manager Delivers WorkloadIQ Security Benefits, http://www.novell.com/products/accessmanager/workloadiq.html, Downloaded circa Feb. 16, 2012, pp. 1-1, Novell.

Tags Input JQuey Plugin, web resource, http://www.webresourcesource.com/tag/tag/, Downloaded circa Feb. 16, 2012, pp. 1-3.

"Vincenzo Di Lecce","Marco Calabrese", "Domenico Sold", Semantic Lexicon-based Multi-agent System for Web Resources markup, 2009 Fourth International Conference on Internet and Web Applications and Services, pp. 143-148,IEEE Computer Society.

(Continued)

*Primary Examiner* — Nicholas Taylor
*Assistant Examiner* — Clayton R Williams
(74) *Attorney, Agent, or Firm* — Narendra Reddy Thappeta (57) ABSTRACT

An aspect of the present invention facilitates users/administrators to control access to electronic resources. In one embodiment, a tag data indicating the corresponding tags associated with each of a set of electronics resources is maintained. In response to receiving from an administrator, a search query indicating a search tag, the tag data is examined and a result set of electronic resources having tags matching the received search tag is identified. The administrator is thereafter enabled to specify an access policy for each of the result set of electronic resources. Thus, administrators are enabled to search for specific resources from a large number of resources and then specify the desired access policies for controlling access to the specific resources.

18 Claims, 5 Drawing Sheets

(56) References Cited

OTHER PUBLICATIONS

"Vuk Milicic", Semantic Web Use Cases and Case Studies, http://www.w3.org/2001/sw/sweo/public/UseCases/Faviki/, Dec. 2008, pp. 1-8.

"Zhuge, Hai", The Web Resource Space Model, Web Information Systems Engineering and Internet Technologies Book Series, 234 p, 2008, vol. 4, XII.

Embedding Semantic Markup in Web Pages, Library Philosophy and Practice, http://www.webpages.uidaho.edu/~mbolin/schilling.pdf, Downloaded circa Feb. 16, 2012, pp. 1-21, University of California.

RSA Identity and Access Management, Federated Identity, Security and Access Management, http://www.rsa.com/node.aspx?id=1186, Downloaded circa Feb. 16, 2012 pp. 1-3, EMC Corporation.

* cited by examiner

```xml
<resources>
    <resource url="www.acme.com/application1/media/video1.mpg">
        <title> Training on Sales and Marketing </title>
        <validUntil> 12-Jul-2012 </validUntil>
        <purpose> To provide training on sales and marketing </purpose>
        <category> Video </category>
        <hasProperty name="city" value="Bangalore" />
        <hasProperty name="accountType" value="sales" />
        <hasProperty name="ageGroup" value="20-40" />
        <hasAdmin userid="admin2" />
    </resource>                                                    } 320
    <resource url="www.acme.com/application1/login.jsp">
        <title> Login Page </title>
        <purpose> To facilitate users to login to the sales application </purpose>
        <category> Webpage </category>
        <hasProperty name="city" value="all" />
        <hasAdmin userid="" />
    </resource>                                                    } 330
    <resource url="www.acme.com/application2/media/reports/daily_rpt.aspx">
        <title>Daily Report on Sales</title>
        <purpose> Daily report on the sales done by each sales person </purpose>
        <category> Webpage</category>
        <hasProperty name="city" value="Newyork" />
        <hasProperty name="accountType" value="managers" />
        <hasAdmin userid="" />
    </resource>                                                    } 340
    ...
</resources>
```
} 310

CONTROLLING ACCESS TO A LARGE NUMBER OF ELECTRONIC RESOURCES

BACKGROUND

1. Technical Field

The present disclosure relates to access management systems and more specifically to controlling access to a large number of electronic resources.

2. Related Art

Electronic resources refer to various data (e.g., files, web pages) and facilities (e.g., cache, services) that are available on digital processing systems. Typically, such electronic resources are accessible over a network. For example, web pages and files are accessible over the Internet based on corresponding Uniform Resource Identifiers (URI), and services are accessible over the Internet using corresponding contracts (in case of service oriented architecture) or simple pre-specified port number (e.g., in case of HTTP, SMTP Mail, etc.).

There is a general need to control access to the corresponding resources. Control can entail restricting (or allowing) access based on variables such as identity of users, time intervals, access mechanisms (e.g., secure connection, protocol), and/or permissible actions (e.g., read only, download) on the resources.

Several aspects of the present invention facilitate controlling access to a large number of resources (e.g., in an enterprise).

BRIEF DESCRIPTION OF THE DRAWINGS

Example embodiments of the present invention are described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention facilitates users/administrators to control access to electronic resources. In one embodiment, a tag data indicating the corresponding tags associated with each of a set of electronics resources is maintained. In response to receiving, from an administrator, a search query indicating a search tag, the tag data is examined and a result set of electronic resources having tags matching the received search tag is identified. The administrator is thereafter enabled to specify an access policy of the identified electronic resources.

Thus, administrators are enabled to search for specific resources from a large number of resources and then specify the desired access policies for controlling access to the specific resources.

According to another aspect of the present invention, the tag data includes a first tag indicating the corresponding user/administrator delegated to control access to the associated electronic resources. Accordingly, in response to receiving from the administrator, the identifier of a second user/administrator delegated to control access to the above noted result set of electronic resources, the first tag associated with each of the result set of electronic resources is set to the received identifier. An access management server allows the second user/administrator to control the result set of electronic resources only in response to setting of the first tag to the identifier.

According to yet another aspect of the present invention, the tag data includes a second tag indicating a date until which the associated electronic resource is valid and access to the associated electronic resource is allowed. Accordingly, in response to receiving from the administrator, a first date for the above noted result set of electronic resources, the second tag associated with each of the result set of electronic resources is set to the received first date. An access management server accordingly allows access to the result set of electronic resources only prior to the first date (and does not allow access after the first date).

According to one more aspect of the present invention, the tag data includes custom tags, each custom tag having a corresponding name and an associated value. The search tag accordingly contains a search name, a comparison operator and a search value. A specific electronic resource is included in the above noted result set of electronic resources only if there exists at least one custom tag associated with the specific electronic resource that has a name matching the search name and has an associated value that satisfies the comparison operator with respect to the search value.

According to an aspect of the present invention, rules are maintained associated with corresponding access policies, with each rule containing a tag. For example, a first rule containing a first tag may be associated with a first access policy, while a second rule containing a second tag may be associated with a second access policy. An access management server is designed to determine the access policies to be evaluated before allowing access to an electronic resource based on the corresponding set of tags associated with the electronic resource. Thus, access management server evaluates the first access policy before allowing access to the electronic resource if the corresponding set of tags includes the first tag, and evaluates the second access policy before allowing access to the electronic resource if the corresponding set of tags includes the second tag.

An administrator, by specifying both the first tag and the second tag to be associated with a desired electronic resource, causes the access management server to evaluate both of the first access policy and the second access policy before allowing access to the desired electronic resource. Thus, the administrator is facilitated to associate (and cause evaluation) of multiple access policies for a single electronic resource.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
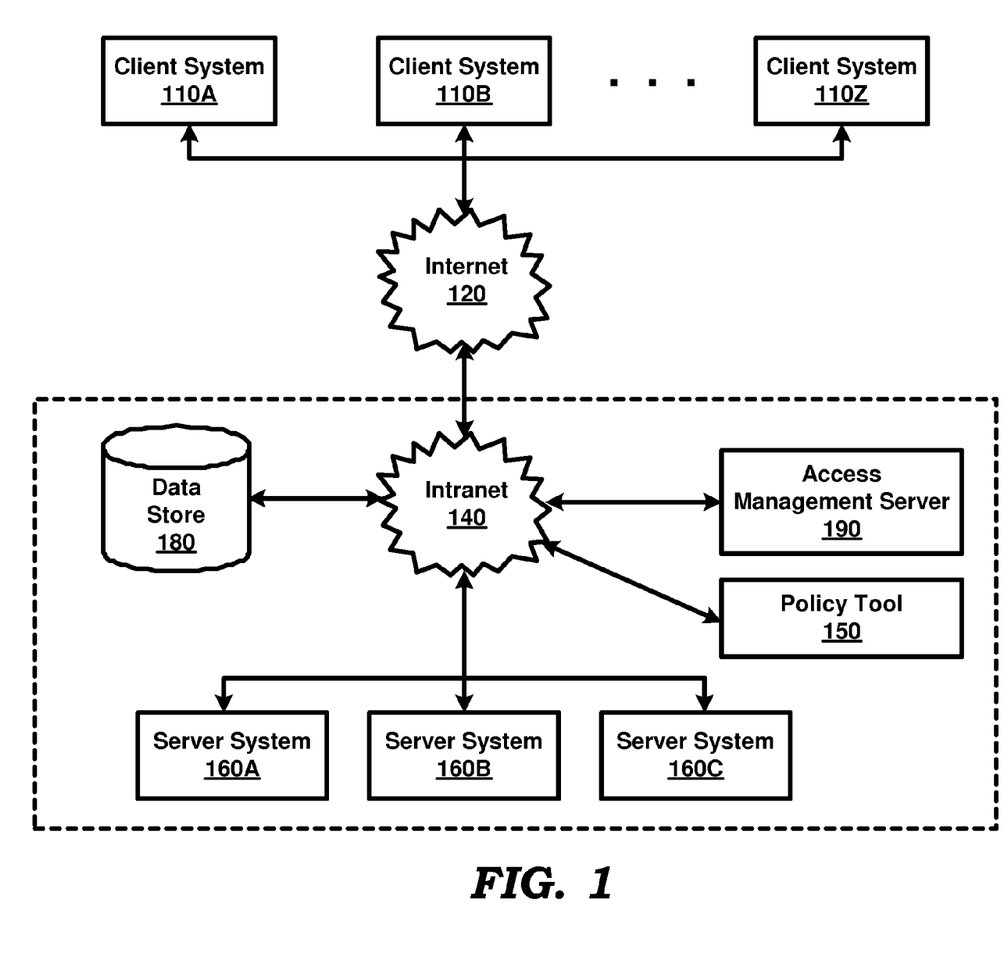
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110Z, Internet 120, intranet 140, policy tool 150, server systems 160A-160C, data store 180 and access management server 190.

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between policy tool 150, server systems 160A-160C, data store 180, and access management server 190, all provided within an enterprise (shown with dotted boundaries). Internet 120 extends the connectivity of these (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by intranet 140 and Internet 120.

Data store 180 represents a non-volatile (persistent) storage facilitating storage and retrieval of a collection of data by applications executing in other systems of the enterprise such as policy tool 150, server systems 160A-160C and access management server 190. Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Each of client systems 110A-110Z represents a system such as a personal computer, workstation, mobile device, etc., used to access various electronic resources (such as data and/or applications) provided within the enterprise, in particular, the resources hosted on server systems 160A-160C. The resources may be accessed based on requests generated by client applications, such as a browser (or other custom applications), executing in the client system (in response to a user interaction). In response to sending the requests, the client system receives the corresponding responses (e.g., web pages), as implemented in the corresponding environment. The web pages/responses may then be presented to the user by the client applications such as the browser.

Each of server systems 160A-160C represents a server, such as a web/application server, capable of hosting electronic resources and thereafter providing access to the hosted resources in processing corresponding requests received from client systems 110A-110Z. Some of the resources on each server may be "protected" resources such that authentication is required, before a user (from one of client systems 110A-110Z) can access the corresponding resources. As noted above, examples of protected electronic resources include but are not restricted to applications executing in the server systems, the web pages provided by the applications, media such as images or videos, etc.

In one embodiment, server systems 160A-160C is designed to operate with access management server 190 for performing authentication and authorization of the users. For example, in response to receiving a request from a user (using one of the client systems) to access a protected resource, the server system hosting the resource sends an access request to access manager server 190, and receives a response indicating whether the requesting user is authenticated and authorized for accessing the requested resource. Once a user is authenticated and authorized, the user may access the resources, for example, using the appropriate web pages.

Access management server 190 represents a system such as a server, which authenticates and also authorizes users attempting to access resources hosted on server systems 160A-160C. An example of an access management server is Oracle Access Manager 11G available from Oracle Corporation, the intended assignee of the present disclosure, though the features can be implemented in various other servers available from various vendors. In one embodiment, the authentication of the users is performed based on one or more authentication schemes, each authentication scheme indicating the specific inputs (credentials) to be collected from the user and the manner/process of authenticating the user based on the collected inputs. Each protected resource is associated with a corresponding one of the different authentication schemes as specified by administrators of the enterprise.

Thus, in response to an access request from a user for accessing a protected resource, access management server 190 determines the specific authentication scheme associated with the protected resource and then allows access to the resource only if the requesting user has been authenticated based on the specific authentication scheme. In a scenario that the requesting user has not been authenticated based on the specific authentication scheme, access management server 190 may perform the specific authentication of the user by providing appropriate user interfaces (e.g. web pages) for collecting and processing the credentials indicated by the specific authentication scheme.

There are several challenges to specifying the authentication schemes for the resources, in particular when the number of resources to be controlled within the enterprise is large (in the order of, for example, several thousands). For example, when the authentication scheme to be used with a group of related resources (for example, the resources associated with the same city, the resources having same account type, or resources applicable for certain set of age groups, etc.) is needed to be changed, an administrator of the enterprise may be required to search for each of the related resource (for example, based on URI), and then change the authentication scheme associated with the resource. In the scenario that the server systems/resources are located at different physical locations/virtual application domains, the administrator may spend considerable amount of time/effort to effect the change in authentication scheme for the entire group of related resources.

In general, an administrator may wish to perform various management actions such as changing the authentication scheme for (noted above), monitoring/viewing on a user interface, etc. a group of resources. The administrator may accordingly be required to manually perform the corresponding management actions for each resource in the group. However, at least when the group of resources is related based on a common property (such as city, account type, age group, etc.), it may be desirable that the task of the administrator to perform the corresponding management actions be made less laborious in terms of time, effort, etc.

In addition to the above, in some environments, an administrator may wish to delegate the controlling (specification of authentication schemes) of a group of resources to other administrators. Also, it may be desirable that a single resource be associated with a set of authentication schemes, such that access management server 190 is facilitated to evaluate and apply the appropriate authentication schemes when providing access to the single resource.

Policy tool 150, provided according to several aspects of the present invention, simplifies controlling access to a large number of electronic resources while overcoming some of the drawbacks noted above. The manner in which policy tool 150 may simplify controlling access to resources is described below with examples.

3. Controlling Access to Electronic Resources

Figure 2:
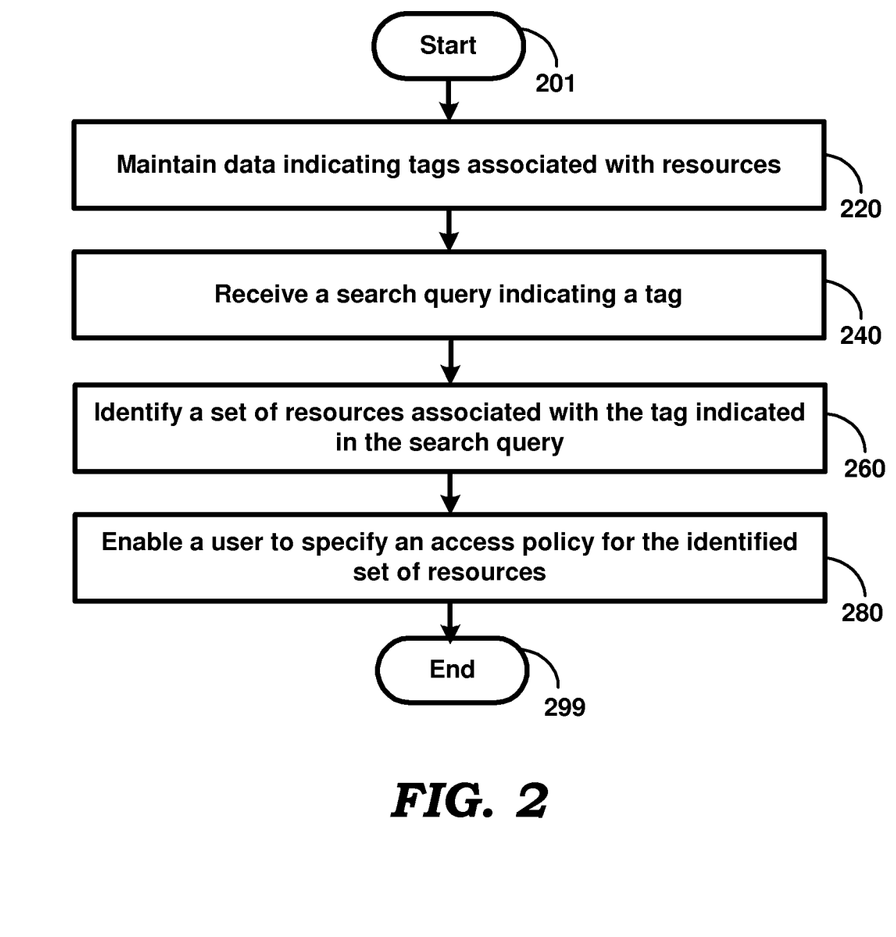
FIG. 2 is a flow chart illustrating the manner in which controlling access to a large number of electronic resources is simplified according to an aspect of the present invention.

FIG. 2 is a flow chart illustrating the manner in which controlling access to a large number of electronic resources is simplified according to an aspect of the present invention. The flowchart is described with respect to FIG. 1 merely for illustration. However, many of the features can be implemented in other environments (and using potentially other types of systems/servers) also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, policy tool 150 maintains data indicating tags associated with electronic resources. A tag refers to text (string of characters) that is associated with a resource, and which indicates a property of the associated resource. The texts to be used as tags may be pre-defined with an administrator merely selecting the appropriate text (depending on the properties of the resources), or alternatively may be any custom (not pre-defined) string of characters specified by the administrator. In one embodiment described below, the tags are of the form "name=value" such as "Title=Login Page", "City=Bangalore", etc.

The tags may be specified by an administrator of the enterprise, when creating/hosting the resources on server systems 160A-160C. Each resource may be associated with any desired set of pre-defined or custom tags based on the properties of the resource. Policy tool 150 may accordingly receive the identifiers (for example, URI) of the resources and corresponding associated tags and store the received information in a non-volatile storage (such as data store 180).

In step 240, policy tool 150 receives a search query indicating a tag. The search query may be received from an administrator using an appropriate user interface provided on one of server systems 160A-160. The administrator may send the search query in response to wanting to perform one of the management actions noted above.

In step 260, policy tool 150 identifies (based on the data maintained in step 220) a set of resources associated with the (search) tag indicated in the search query. The identification of the resources may entail retrieval of the data stored in data store 180, checking whether the text of the search tag matches (is the same as, is similar to, or substantially the same as) any of the text of the stored tags associated with the resources, and determining the identifiers of the resources associated with matching tags. In the embodiment where the tags are in the form "name=value", the text of the names and the corresponding values may be required to be matched separately (for example, when the search query specifies the name and value separately).

In step 280, policy tool 150 enables an administrator/user to specify an access policy for the identified set of resources. Access policies specify one or more of aspects such as who (e.g., which group/class/category of users), when (e.g., durations of day/week) and how (e.g., only by VPN) users access one or more protected resources. In the environment of FIG. 1, the authentication schemes described above represent the access policies used to control access to the protected resources. The flow chart ends in step 299.

Thus, an administrator of the enterprise is able to identify the desired group of related resources by searching for a tag corresponding to the common property (such as city, age group, etc.) and then specify the access policy to be used for the identified resources. Controlling access of resources is accordingly simplified (at least in terms of the amount of time/effort spent by the administrator).

Other management actions such as selecting resources to a user interface may be similarly performed by choosing the appropriate tags/texts to be associated with the resources. The manner in which policy tool 150 simplifies controlling access to a large number of electronic resources according to the steps of FIG. 2 is described below with examples.

4. Illustrative Example

Figure 3:
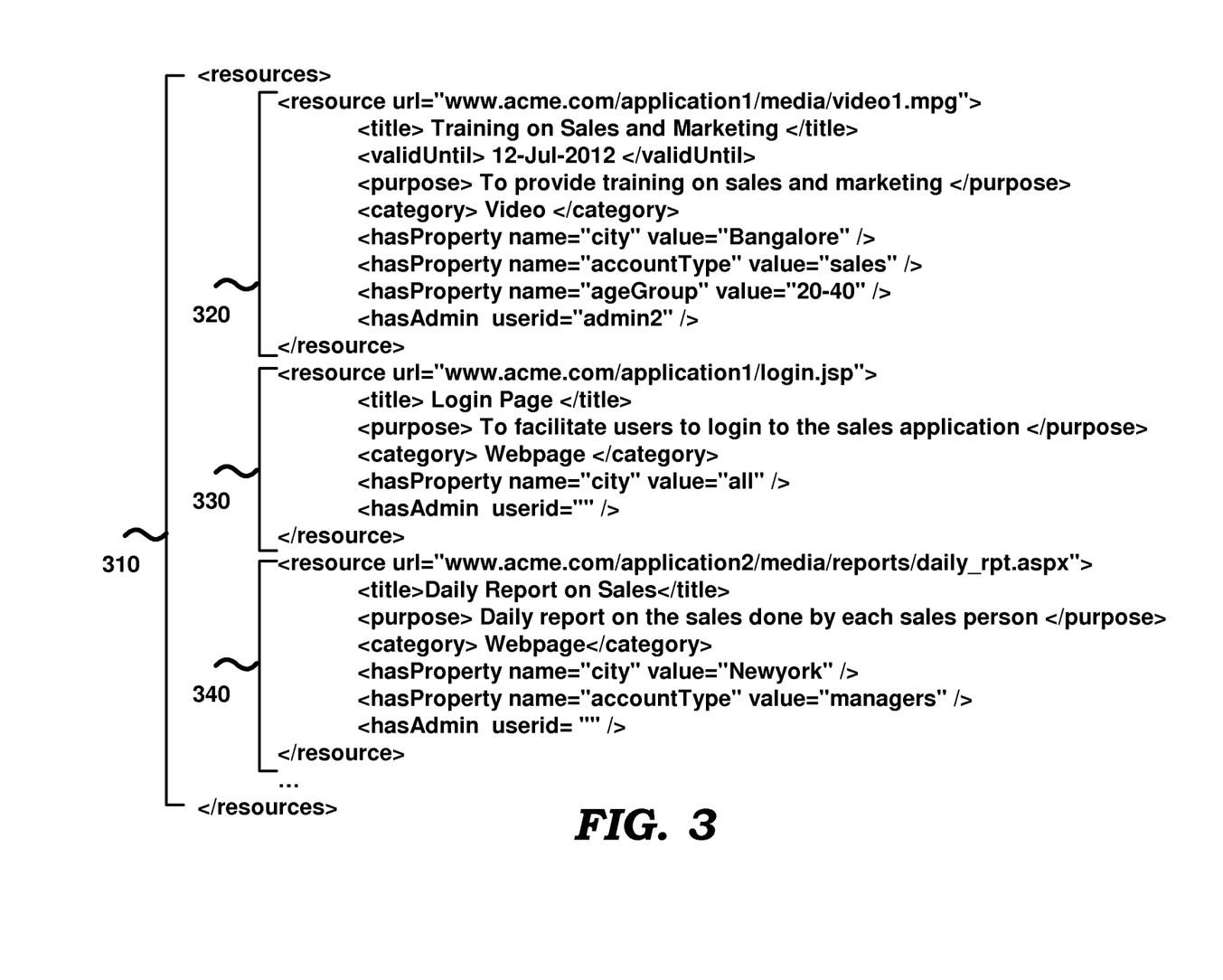
FIG. 3 depicts portions of a tag data indicating the association of tags with corresponding electronic resources in one embodiment.
Figure 4:
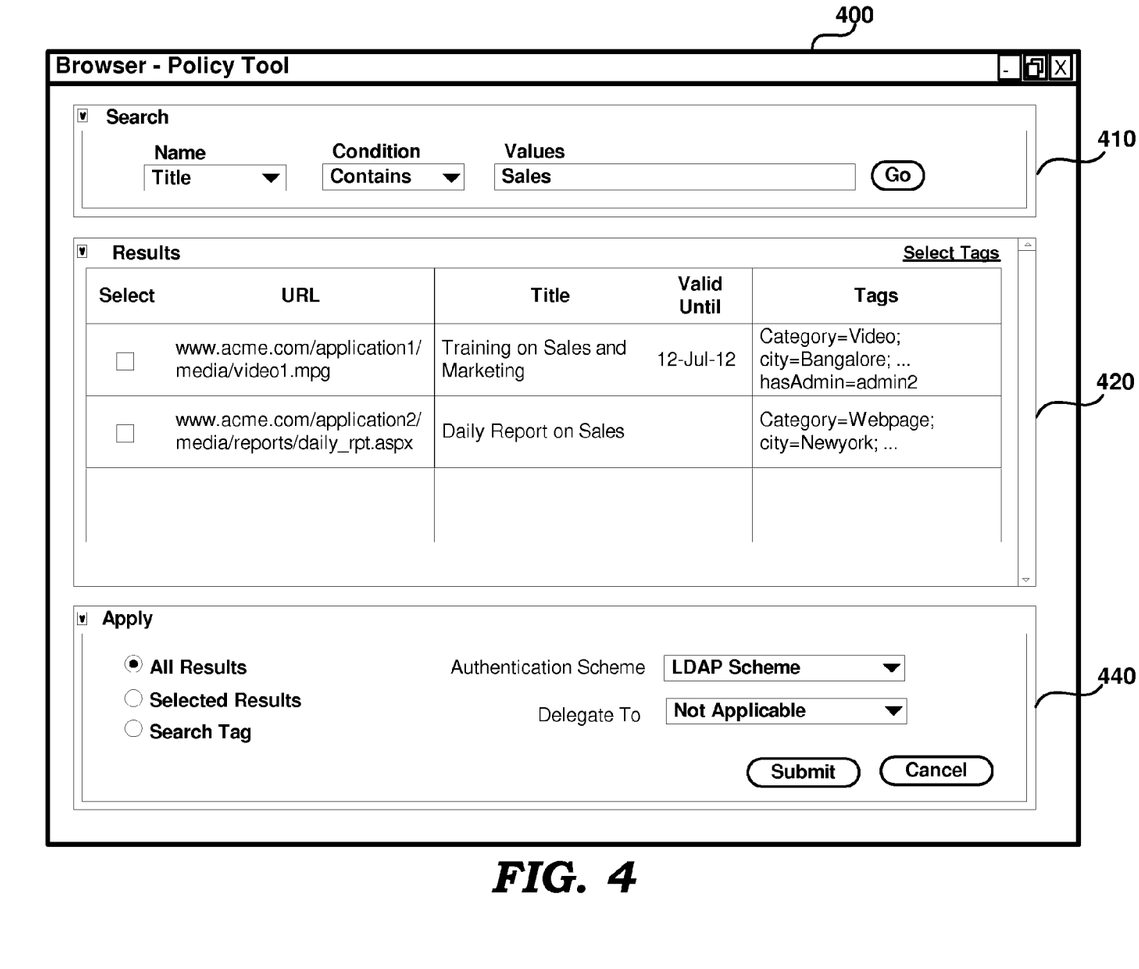
FIG. 4 depicts the manner in which administrators (of an enterprise) are enabled to control access to a larger number of resources of the enterprise in one embodiment.

FIGS. 3 and 4 together illustrate the manner in which controlling access to a large number of electronic resources is simplified in one embodiment. Each of the Figures is described in detail below.

FIG. 3 depicts portions of a tag data indicating the association of tags with corresponding electronic resources in one embodiment. The tag data is shown as being specified according to extensible markup language (XML) for illustration. In alternate embodiments, the tag data may be specified using any convenient other data structures (such as a table in a relational database) or formats such as properties files, as will be apparent to one skilled in the relevant arts by reading the disclosure herein.

Data portion 310 specifies the details of the resources and the corresponding tags associated with each of the resources. In particular, each of data portions 320, 330 and 340 specify the details of the tags associated with a corresponding resource identified by the corresponding value (e.g. "www.acme.com/application1/media/video1.mpg") of the "url" attribute.

In data portion 310, it may be observed that the resource is associated with different pre-defined tags having names such as title, validUntil (to indicate the date until which the resource is valid, and access is allowed), purpose and category and corresponding values. Custom tags are also shown associated with the resource using the "hasProperty" XML element. Each custom tag is shown in the form of a name such as city, accountType and ageGroup and corresponding values such as "Bangalore", "sales", "20-40" etc. Similarly, the other resources in data portions 330 and 340 are shown associated with corresponding tags.

Thus, tag data indicating the tags associated with different resources is maintained by policy tool 150. An administrator of the enterprise may thereafter perform a search (using policy tool 150) based any desired pre-defined/custom tags to identify the desired group of related resources and then perform the desired management actions such as specifying the access policy (in one embodiment, authentication schemes noted above), monitoring/viewing the resources on a user interface, etc.

An aspect of the present invention facilitates an administrator to delegate the controlling (specification of authentication schemes) of a group of resources to other administrators. In one embodiment, each resource is associated with a specific tag (having the name "hasAdmin") that indicates the administrator (the corresponding value) delegated to specify access (authentication scheme) for that resource. Thus, in data portion 320, the corresponding resource is indicated to be delegated to the administrator having the user id "admin2" as indicated by the value of the "hasAdmin" tag name.

In one embodiment, policy tool 150 is also designed to receive a search query indicating a search tag (e.g., "city=Bangalore") and the user id (e.g. "admin2") of the administrator delegated for the resources, and in response, set the value of the "hasAdmin" tag name to the received user id for all the resources that match the search tag. Access management server 190 is designed to thereafter enable the delegated administrators to control the specified resources. With respect to data portion 320, the user having the identifier "admin2" is allowed to specify access policies for the corresponding resource.

It should be noted that access management server 190 does not allow the delegated administrators (such as "admin2") to control the electronic resources (such as in data portion 320) prior to setting of the "hasAdmin", and allows the delegated administrator to control the resources only in response to setting the "hasAdmin" name of the resource to the value of the identifier of the administrator. It should be noted that value of "hasAdmin" may be set to multiple identifiers (for example, as a comma separated list), though only one identifier is shown in FIG. 3 for illustration.

Another aspect of the present invention facilitates a single resource to be associated with multiple authentication schemes. In one embodiment, an administrator indicates that specific authentication schemes are to be applied only when corresponding rules/conditions based on one or more tags (associated with the resources) are satisfied. For example, the administrator may indicate that a first authentication scheme is to be applied only when a first rule {tag name "city" has the value "Bangalore"} is satisfied, while a second authentication scheme is to applied only when a second rule tag name {"title" contains the word "sales"} is satisfied.

In response to an access request for a resource, access management server 190 is designed to retrieve the tags associated with the resource, determine the set of authentication schemes whose rules are satisfied based on the retrieved tags, evaluate the determined schemes based on the context in which the resource is sought to be accessed, and thereafter determine whether the access to the resource is to be granted based on the evaluation.

Thus, for the above noted example, an access request for the resource of data portion 320 causes both the first and second authentication schemes to be included in the determined set since the tags in data portion 320 satisfies both the first and the second rules, that is, has both the city value to be "Bangalore" and the title value to contain "sales". However, for the resource of data portion 330, neither of the first and second authentication schemes are included (since both the first and second rules are not satisfied) and for the resource of data portion 340, only the second authentication scheme is included (since only the second rule is satisfied, while the city value of "Newyork" does not satisfy the first rule).

Accordingly, an administrator by specifying the appropriate tags for a single resource is enabled to associate multiple authentication schemes to the single resource. Though described above with respect to authentication schemes for illustration, it may be appreciated that such rules/conditions based on tags may be specified for other types of policy artifacts used by access management server 190 such as authentication policies, authorization policies, etc. as well, with access management server 190 designed to provide access to users/resources based on the specified rules/conditions as will be apparent to one skilled in the relevant arts by reading the disclosure herein.

An example user interface provided by policy tool 150 to facilitate administrators to search for desired resources and perform appropriate management actions is described in detail below.

5. Example User Interface

FIG. 4 depicts the manner in which administrators (of an enterprise) are enabled to control access to a larger number of resources of the enterprise in one embodiment. Display area 400 depicts a portion of a user interface provided on a display unit (not shown in FIG. 1) associated with one of server systems 160A-160C (or access management server 190). Display area 400 corresponds to a webpage accessed by the administrators in response to sending a request (including an identifier of the webpage) to policy tool 150. The web page is received from policy tool 150 prior to being displayed on the display unit.

Display area 410 enables an administrator/user to search for the desired tags. As the tags are in the form of name-value pairs, the user specifies the name (e.g. Title, Purpose), values (e.g. sales) and a corresponding condition (e.g., contains, equals, like) to be satisfied by the input name and values. Accordingly, for the inputs shown in display area 410, the search tag may be viewed as "title [contains] sales", where the square brackets indicates that the matching is to be performed based on "contains".

In response to the user clicking/selecting the "Go" button, policy tool 150 receives data representing the selection and examines the data to determine the resources having tags matching the search tag. With respect to the tag data of FIG. 3, policy tool determines that the resources in data portions 320 and 340 match the search tag, since the corresponding values ("Training on Sales and Marketing" and "Daily Report on Sales") of the "title" name contains the text "sales". However, the resource in data portion 330 is deemed to be not matching since the value "Login Page" does not contain the text "sales". Display area 420 shows the resources matching the search tag, in particular, the resources in data portions 320 and 340. A user may select the specific tags to be shown as part of the results table by clicking on the "Select Tags" link.

Display area 430 enables a user/administrator to perform various management actions on the identified set of resources. The actions may be performed on all the identified (result) resources, on resources selected from the results (using the check boxes shown corresponding to each resource in display area 420), or with the search tag specified in display area 410. For example, the user may select an authentication scheme or a delegated administrator using the corresponding selection fields provided, and then click/select "Submit" button to apply/perform the specified action. Other actions (such as selecting resources for viewing/monitoring) may be similarly provided, as will be apparent to one skilled in the relevant arts by reading the disclosure herein.

Thus, in response to a user selecting "All Results" and the "LDAP scheme" in the authentication scheme field and clicking the Submit button, policy tool 150 stores data (in data store 180) indicating that the LDAP scheme is to be applied to the resources indicated in data portions 320 and 340. Access management server 190 accordingly uses the LDAP scheme for authenticating the user when these two resources are sought to be accessed, and provides access only after successful authentication according to the LDAP scheme.

In the scenario that the user selects an administrator in the "Delegate To" selection field, policy tool 150 updates the tag data (in particular, the value of the "hasAdmin" name) to indicate the identifier of the selected (delegated) administrator. The selection field may also enable the user to select multiple administrators for delegation, and policy tool 150 may accordingly store the identifiers of the selected administrators (for example, as a comma separated list) as the value of the "hasAdmin" Furthermore, when the user selects the option "Search Tag", and then selects an authentication scheme, policy tool 150 updates a data (in data store 180) to indicate that the selected authentication scheme is applicable for all resources matching the specified/searched tag.

Thus, the user interface of FIG. 4 facilitates administrators of the enterprise to search for desired resources based on tags and apply desired access policies/authentication schemes to the resources. The administrators are accordingly enabled to control access to a large number of electronic resources.

It should be further appreciated that the features described above can be implemented in various embodiments as a desired combination of one or more of hardware, executable modules, and firmware. The description is continued with respect to an embodiment in which various features are operative when the instructions in the executable modules are executed.

6. Digital Processing System

Figure 5:
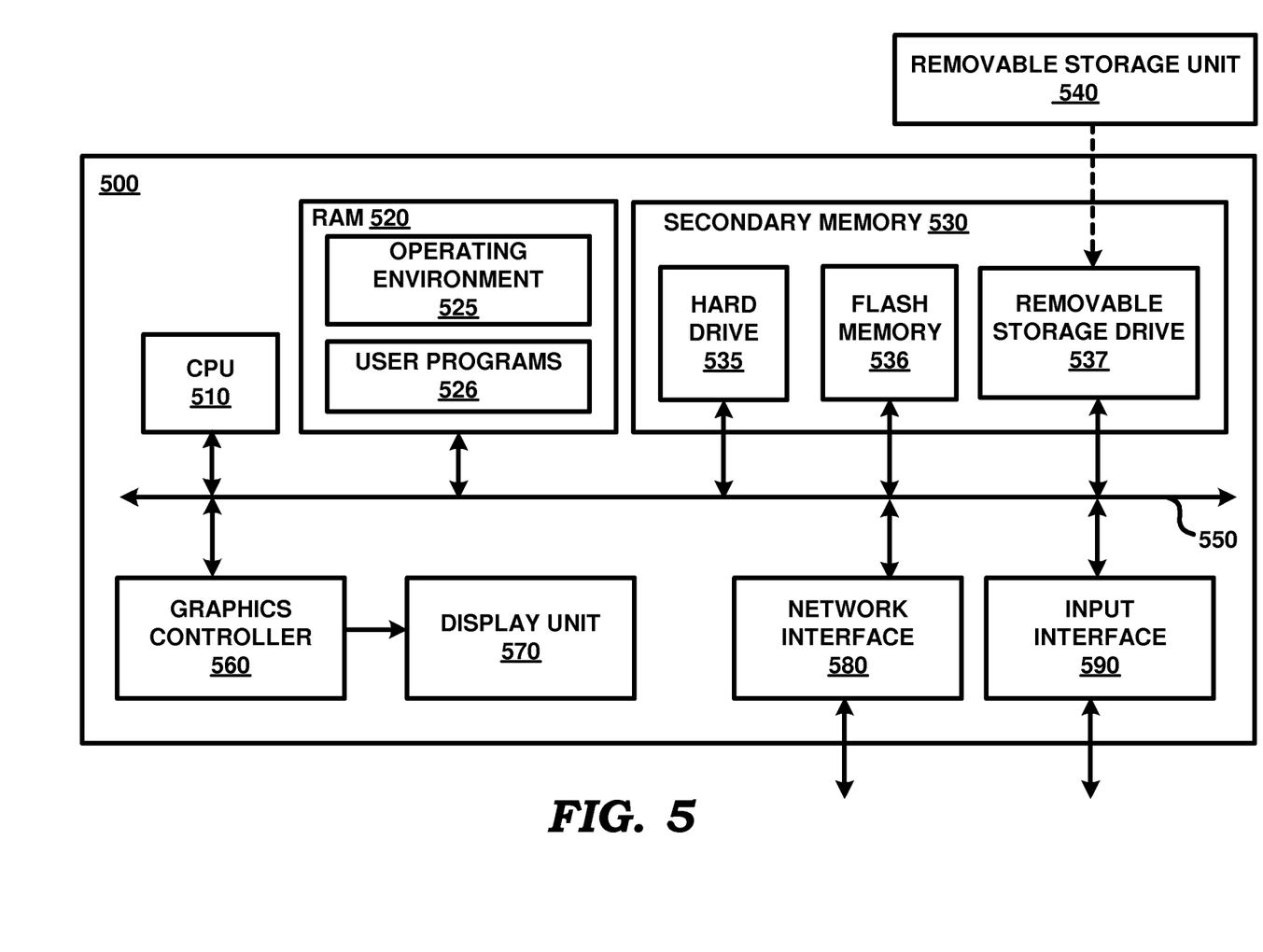
FIG. 5 is a block diagram illustrating the details of a digital processing system in which several aspects of the present invention are operative by execution of appropriate software instructions.

FIG. 5 is a block diagram illustrating the details of digital processing system 500 in which several aspects of the present invention are operative by execution of appropriate software instructions. Digital processing system 500 corresponds to policy tool 150, or any system implementing the features of FIGS. 2-4 described above.

Digital processing system 500 may contain one or more processors (such as a central processing unit (CPU) 510), random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting shared environment 525 and/or user programs 526 (such as networking applications, database applications, etc.). Shared environment 525 contains utilities shared by user programs, and such shared utilities include operating system, device drivers, virtual machines, flow engine, etc., which provide a (common) run time environment for execution of user programs/applications.

Graphics controller 560 generates display signals (e.g., in RGB format) to display unit 570 based on data/instructions received from CPU 510. Display unit 570 contains a display screen to display the images defined by the display signals (such as the portions of the user interface of FIG. 4). Input interface 590 may correspond to a keyboard and a pointing device (e.g., touch-pad, mouse) that may be used to provide various inputs (such as entering the search tag, selecting the authentication scheme/administrator to be applied, in the user interface of FIG. 4). Network interface 580 provides connectivity to a network (e.g., using Internet Protocol), and may be used to communicate with other connected systems (such as server systems 160A-160C or client systems 110A-110Z).

Secondary memory 530 may contain hard drive 535, flash memory 536, and removable storage drive 537. Secondary memory 530 represents a non-transitory medium, which may store the data (for example, portions of tag data shown in FIG. 3) and software instructions (for example, for performing the steps of FIG. 2), to enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of facilitating users to control access to electronic resources, said method being performed at least in part by a first system, said method comprising:

maintaining a tag data indicating a corresponding set of tags associated with each of a plurality of electronic resources, each tag being a pair formed of a tag name and a tag value;

receiving, from a first user using a second system, a search query indicating a search name, a search value and a condition;

identifying, by examining said tag data in response to said receiving, a first set of electronic resources of said plurality of electronic resources having tags matching said search query, wherein an electronic resource of said plurality of electronic resources is included in said first set of electronic resources if the electronic resource has an associated tag with the tag name equaling the received search name and the tag value satisfying the received condition in relation to said received search value; and enabling said first user to apply a desired access policy for a plurality of desired electronic resources, wherein said enabling further comprising:

sending for display at said second system, a first data indicating said first set of electronic resources as having tags matching said search query, said first data being sent along with a list of access policies, said list of access policies including a first access policy, wherein said first set of electronic resources and said list of access policies are displayed in a user interface at said second system, said user interface enabling said first user to select said desired access policy and said plurality of desired electronic resources;

receiving from said second system, in response to said sending, a second data indicating that said plurality of desired electronic resources have been selected among said first set of electronic resources, and that said first access policy has been selected as said desired access policy from said list of access policies in said user interface; and in response to receiving of said second data, storing data indicating that said first access policy is thereafter applicable to controlling access to said plurality of desired electronic resources.

2. The method of claim 1, wherein said tag data includes a first tag associated with each of said plurality of electronic resources, wherein said first tag indicates a corresponding user delegated to control access to the associated electronic resources, wherein an access management server allows users to control access to electronic resources based on said first tag, said method further comprising:

receiving, from said first user, an identifier of a second user delegated to control access to said first set of electronic resources; and setting, in response to receiving said identifier, said first tag associated with each of said first set of electronic resources to said identifier of said second user, wherein said access management server does not allow said second user to control said first set of electronic resources prior to said setting, and allows said second user to control said first set of electronic resources in response to said setting of said first tag to said identifier.

3. The method of claim 1, wherein said tag data includes a second tag associated with each of said plurality of resources, wherein said second tag indicates a date until which the associated electronic resource is valid and access to the associated electronic resource is allowed, said method further comprising:

enabling said first user to specify a first date for said first set of electronic resources; and setting, in response to said first user specifying said first date, said second tag associated with each of said first set of electronic resources to said first date, wherein an access management server allows access to said first set of electronic resources prior to said first date, and does not allow access to said first set of electronic resources after said first date in response to said setting of said second tag to said first date.

4. The method of claim 1, wherein said corresponding set of tags associated with each of a plurality of electronics resources includes custom tags, each custom tag also having a corresponding tag name and an associated tag value, wherein a specific electronic resource is included in said first set of electronic resources also if there exists at least one custom tag associated with the specific electronic resource having the tag name equaling the received search name and the tag value satisfying the received condition in relation to said received search value.

5. The method of claim 1, further comprising:

maintaining a first rule associated with a first access policy and a second rule associated with a second access policy, wherein said first rule contains a first tag and said second rule contains a second tag, wherein an access management server is designed to determine the access policies to be evaluated before allowing access to an electronic resource based only on said corresponding set of tags associated with said electronic resource, wherein said access management server evaluates said first access policy before allowing access to said electronic resource if said corresponding set of tags includes said first tag, said access management server also evaluating said second access policy before allowing access to said electronic resource if said corresponding set of tags includes said second tag.

6. The method of claim 5, wherein said corresponding set of tags associated with a second electronic resource includes both of said first tag and said second tag,
wherein said access management server evaluates both of said first access policy and said second access policy before allowing access to said second electronic resource.

7. The method of claim 1, wherein said user interface comprises a first option to indicate selection of all of said first set of electronic resources and a second option to indicate selection of specific ones of said first set of electronic resources.

8. A non-transitory machine readable medium storing one or more sequences of instructions for causing a first system to facilitate users to control access to electronic resources, wherein execution of said one or more instructions by one or more processors contained in said first system causes said first system to perform the actions of:
maintaining a tag data indicating a corresponding set of tags associated with each of a plurality of electronic resources, each tag being a pair formed of a tag name and a tag value;
receiving, from a first user using a second system, a search query indicating a search name, a search value and a condition;
identifying, by examining said tag data in response to said receiving, a first set of electronic resources of said plurality of electronic resources having tags matching said search query, wherein an electronic resource of said plurality of electronic resources is included in said first set of electronic resources if the electronic resource has an associated tag with the tag name equaling the received search name and the tag value satisfying the received condition in relation to said received search value; and
enabling said first user to apply a desired access policy for a plurality of desired electronic resources, wherein said enabling further comprising:
sending for display at said second system, a first data indicating said first set of electronic resources as having tags matching said search query, said first data being sent along with a list of access policies, said list of access policies including a first access policy, wherein said first set of electronic resources and said list of access policies are displayed in a user interface at said second system, said user interface enabling said first user to select said desired access policy and said plurality of desired electronic resources;
receiving from said second system, in response to said sending, a second data indicating that said plurality of desired electronic resources have been selected among said first set of electronic resources, and that said first access policy has been selected as said desired access policy from said list of access policies in said user interface; and
in response to receiving of said second data, storing data indicating that said first access policy is thereafter applicable to controlling access to said plurality of desired electronic resources.

9. The non-transitory machine readable medium of claim 8, wherein said tag data includes a first tag associated with each of said plurality of electronic resources, wherein said first tag indicates a corresponding user delegated to control access to the associated electronic resources, wherein an access management server allows users to control access to electronic resources based on said first tag, further comprising one or more instructions for:
receiving, from said first user, an identifier of a second user delegated to control access to said first set of electronic resources; and
setting, in response to receiving said identifier, said first tag associated with each of said first set of electronic resources to said identifier of said second user,
wherein said access management server does not allow said second user to control said first set of electronic resources prior to said setting, and allows said second user to control said first set of electronic resources in response to said setting of said first tag to said identifier.

10. The non-transitory machine readable medium of claim 8, wherein said tag data includes a second tag associated with each of said plurality of resources, wherein said second tag indicates a date until which the associated electronic resource is valid and access to the associated electronic resource is allowed, further comprising one or more instructions for:
enabling said first user to specify a first date for said first set of electronic resources; and
setting, in response to said first user specifying said first date, said second tag associated with each of said first set of electronic resources to said first date,
wherein an access management server allows access to said first set of electronic resources prior to said first date, and does not allow access to said first set of electronic resources after said first date in response to said setting of said second tag to said first date.

11. The non-transitory machine readable medium of claim 8, wherein said corresponding set of tags associated with each of a plurality of electronics resources includes custom tags, each custom tag also having a corresponding tag name and an associated tag value,
wherein a specific electronic resource is included in said first set of electronic resources also if there exists at least one custom tag associated with the specific electronic resource having the tag name equaling the received search name and the tag value satisfying the received condition in relation to said received search value.

12. The non-transitory machine readable medium of claim 8, further comprising one or more instructions for:
maintaining a first rule associated with a first access policy and a second rule associated with a second access policy, wherein said first rule contains a first tag and said second rule contains a second tag,
wherein an access management server is designed to determine the access policies to be evaluated before allowing access to an electronic resource based on said corresponding set of tags associated with said electronic resource,
wherein said access management server evaluates said first access policy before allowing access to said electronic resource if said corresponding set of tags includes said first tag, said access management server also evaluating said second access policy before allowing access to said electronic resource if said corresponding set of tags includes said second tag.

13. The non-transitory machine readable medium of claim 12, wherein said corresponding set of tags associated with a second electronic resource includes both of said first tag and said second tag,
wherein said access management server evaluates both of said first access policy and said second access policy before allowing access to said second electronic resource.

14. A computing system comprising:
a plurality of server systems to host a plurality of electronic resources;
a plurality of client systems to enable users to access said plurality of electronic resources;
an access management server to allow access to said plurality of electronic resources based on access policies specified for each electronic resource;
a data store to maintain a tag data indicating a corresponding set of tags associated with each of said plurality of electronic resources, each tag being a pair formed of a tag name and a tag value; and
a policy tool operable to:
receive, from an administrator using a server system of said plurality of server systems, a search query indicating a search name, a search value and a condition;
identify, by examining said tag data in response to said receive, a first set of electronic resources of said plurality of electronic resources having tags matching said search query, wherein an electronic resource of said plurality of electronic resources is included in said first set of electronic resources if the electronic resource has an associated tag with the tag name equaling the received search name and the tag value satisfying the received condition in relation to said received search value; and
enable said administrator to apply a desired access policy for a plurality of desired electronic resources, wherein to enable, said policy tool is operable to:
send for display at said server system, a first data indicating said first set of electronic resources as having tags matching said search query, said first data being sent along with a list of access policies, said list of access policies including a first access policy, wherein said first set of electronic resources and said list of access policies are displayed in a user interface at said server system, said user interface enabling said first user to select said desired access policy and said plurality of desired electronic resources;
receive from said server system, in response to said send, a second data indicating that said plurality of desired electronic resources have been selected among said first set of electronic resources, and that said first access policy has been selected as said desired access policy from said list of access policies in said user interface; and
store, in response to said receive, data indicating that said first access policy is thereafter applicable to control access to said plurality of desired electronic resources,
wherein said access management server allows access to said plurality of desired electronic resources based on said first access policy,
wherein each of said plurality of server systems, said plurality of client systems, said access management server and said policy tool comprises a corresponding processor and a corresponding memory, wherein each corresponding processor is operatively coupled to said corresponding memory to retrieve and execute instructions stored in said corresponding memory.

15. The computing system of claim 14, wherein said tag data includes a first tag associated with each of said plurality of electronic resources, wherein said first tag indicates the corresponding administrator delegated to control access to the associated electronic resources,
wherein said access management server allows administrators to control access to electronic resources based on said first tag,
wherein said policy tool is further operable to:
receive, from said administrator, an identifier of a second administrator delegated to control access to said first set of electronic resources; and
set, in response to receiving said identifier, said first tag associated with each of said first set of electronic resources to said identifier of said second administrator,
wherein said access management server does not allow said second administrator to control said first set of electronic resources prior to said setting, and allows said second administrator to control said first set of electronic resources in response to said setting of said first tag to said identifier.

16. The computing system of claim 14, wherein said tag data includes a second tag associated with each of said plurality of resources, wherein said second tag indicates a date until which the associated electronic resource is valid and access to the associated electronic resource is allowed,
wherein said policy tool is further operable to:
enable said administrator to specify a first date for said first set of electronic resources; and
set, in response to said administrator specifying said first date, said second tag associated with each of said first set of electronic resources to said first date,
wherein said access management server allows access to said first set of electronic resources prior to said first date, and does not allow access to said first set of electronic resources after said first date in response to said setting of said second tag to said first date.

17. The computing system of claim 14, wherein said corresponding set of tags associated with each of a plurality of electronics resources includes custom tags, each custom tag also having a corresponding tag name and an associated tag value,
wherein a specific electronic resource is included in said first set of electronic resources also if there exists at least one custom tag associated with the specific electronic resource having the tag name equaling the received search name and the tag value that satisfies the received condition in relation to said received search value.

18. The computing system of claim 14, wherein said policy tool is further operable to:
maintain a first rule associated with a first access policy and a second rule associated with a second access policy, wherein said first rule contains a first tag and said second rule contains a second tag,
wherein said access management server is designed to determine the access policies to be evaluated before allowing access to an electronic resource based on said corresponding set of tags associated with said electronic resource,
wherein said access management server evaluates said first access policy before allowing access to said electronic resource if said corresponding set of tags includes said first tag, said access management server also evaluating said second access policy before allowing access to said electronic resource if said corresponding set of tags includes said second tag such that said access management server evaluates both of said first access policy and said second access policy before allowing access to said electronic resource if said corresponding set of tags includes both of said first tag and said second tag.

* * * * *

UNITED STATES PATENT AND TRADEMARK OFFICE
CERTIFICATE OF CORRECTION

PATENT NO. : 9,104,666 B2  
APPLICATION NO. : 13/602340  
DATED : August 11, 2015  
INVENTOR(S) : Goyal et al.

Page 1 of 1

It is certified that error appears in the above-identified patent and that said Letters Patent is hereby corrected as shown below:

On the title page,

Column 1, item (75), under Inventors, line 1, delete "Banagalore (IN);" and insert
-- Bangalore (IN); --, therefor.

Column 2, item (56), under Other Publications, line 11, delete "JQuey" and insert -- JQuery --, therefor.

In the specification,

In column 7, lines 54-55, delete "tag name {"title"" and insert -- {tag name "title" --, therefor.

In column 9, line 25, delete ""hasAdmin"" and insert -- "hasAdmin". --, therefor.

Signed and Sealed this
Fifth Day of July, 2016

Michelle K. Lee
*Director of the United States Patent and Trademark Office*